United States Patent [19]
Lindsey

[11] Patent Number: 5,133,627
[45] Date of Patent: Jul. 28, 1992

[54] TIP-RELIEVED SPIRAL BEVEL GEAR AND METHOD

[75] Inventor: Charles E. Lindsey, Middletown, Ill.

[73] Assignee: Caterpillar Inc., Peoria, Ill.

[21] Appl. No.: 720,280

[22] Filed: Jun. 24, 1991

Related U.S. Application Data

[62] Division of Ser. No. 576,034, Aug. 31, 1990, Pat. No. 5,058,449.

[51] Int. Cl.⁵ .......................... B23F 9/10; B23F 19/10
[52] U.S. Cl. ........................................ 409/26; 51/287; 409/8
[58] Field of Search ................ 409/2, 8, 26–30, 409/9, 13; 51/287

[56] References Cited

FOREIGN PATENT DOCUMENTS 0071116 4/1985 Japan ............................ 409/8

*Primary Examiner*—Z. R. Bilinsky
*Attorney, Agent, or Firm*—John W. Grant

[57] ABSTRACT

Prior art non-generated, tip-relieved spiral bevel gears had tip-relieved surfaces that were nonuniform from the toe to the heel thereof. The subject tip-relieved spiral bevel gear is adapted to be manufactured by a gear generating machine, and includes a plurality of modified gear teeth individually having a convex tooth face and a relatively uniform tip-relieved surface on the convex tooth face from the toe to the heel portion thereof essentially parallel to the face angle at the outer tip surface. A two-pass method of machining the modified gear teeth is described.

3 Claims, 2 Drawing Sheets

TIP-RELIEVED SPIRAL BEVEL GEAR AND METHOD

This is a division of Ser. No. 07/576,034 filed Aug. 31, 1990 now U.S. Pat. No. 5,058,449.

DESCRIPTION

1. Technical Field

This invention relates generally to a modified spiral bevel gear and method of making the gear, and more particularly to a tip-relieved spiral bevel gear and method of machining the gear on a gear generating machine.

2. Background Art

Relatively large bevel gear and pinion sets have long been used in the power trains of heavy duty earthmoving equipment. On large off-highway mining trucks the heavy dynamic loads experienced on such sets have resulted in gear support deflections and tooth deflections which cause non-conjugate contact, which in turn causes the gear tooth tip to improperly engage the pinion in the area of the start of active profile (SAP). This can ultimately result in pitting failure of the teeth.

In order to solve the aforementioned problem the active profile of the large bevel gear was modified on the convex tooth face of each tooth to remove material adjacent the tip. These prior non-generated, tip-relieved spiral bevel gears did result in improvement in the service life of the bevel gear and pinion sets. However, each bevel gear was finished cut on a machine requiring a rotary milling cutter having cutter blades with a preselected special relief profile. This provided a tip relief parallel to the root line that was nonuniform from the toe to the heel thereof. These modified bevel gears required specially designed cutter blades, and both the blades and the gear teeth were difficult to inspect because of the close tolerances required.

Accordingly, what is needed is a spiral bevel gear with a much more uniform tip relief across the tooth face thereof, and a reliable method of manufacturing such a bevel gear without resorting to the need for a modified set of special cutting blades. The more uniform tip relief must result in an improvement in the mating contact pattern with the associated pinion gear and minimal pitting after an extended service period.

The present invention is directed to overcoming one or more of the problems as set forth above.

DISCLOSURE OF THE INVENTION

In accordance with one aspect of the present invention a tip-relieved spiral bevel gear is adapted to be manufactured on a gear generating machine, and desirably includes a gear body having a plurality of modified gear teeth around the periphery thereof. Each one of the teeth has a preselected face angle and a curved profile defining a concave tooth face and a convex tooth face from the tip surface to the root surface, and at least one of the tooth faces is modified to have a relatively uniform tip-relieved surface from the toe portion to the heel portion essentially parallel to the face angle at the outer tip surface.

In accordance with another aspect of the present invention a method of machining a spiral bevel gear having a plurality of modified gear teeth is provided wherein the modified gear teeth individually have a preselected face angle and a curved profile defining a concave tooth face and a convex tooth face from an outer tip surface to an inner root surface. The method includes the following steps: (a) cutting a plurality of semi-finished teeth in a gear piece mounted on a workpiece spindle of the gear generating machine; (b) inputting the basic machine settings required to produce the tip relief into the gear generating machine; (c) rotating the cradle to a preselected start position; (d) rotating the workpiece spindle to the home position; (e) rotating the cradle to a preselected center roll position; (f) advancing the sliding base and rotating the workpiece in the workpiece spindle to locate the convex tooth face of a tooth against the cutting tool, and withdrawing the sliding base; (g) rotating the cradle to the start position; (h) rotating the workpiece spindle to the home position; (i) resetting the sliding base a preselected distance; and (j) cutting the teeth in a second pass of the cutting tool and providing a relatively uniform tip-relieved surface from the toe portion to the heel portion essentially parallel to the face angle at the outer tip surface.

BEST MODE FOR CARRYING OUT THE INVENTION

Figure 2:
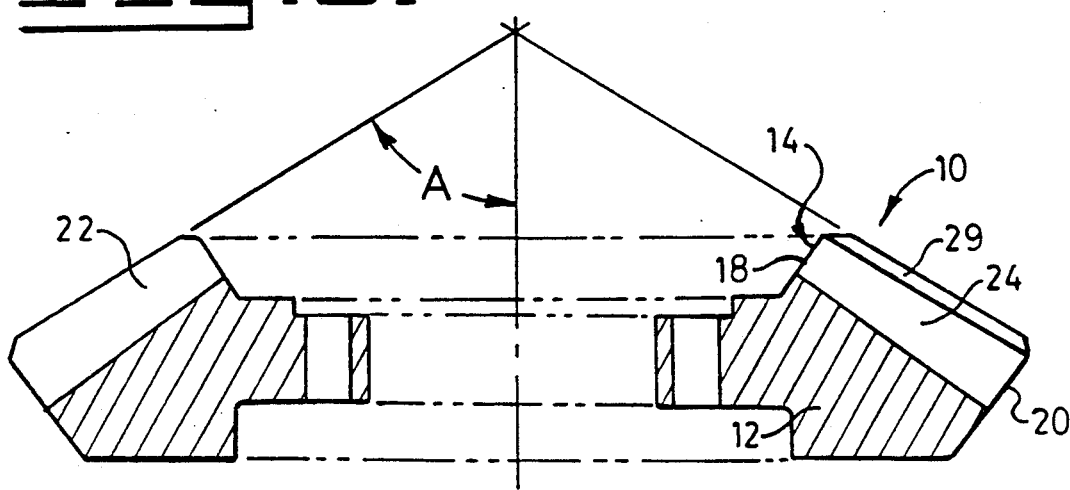
FIG. 2 is a diagrammatic cross section of the tip-relieved spiral bevel gear of the present invention.
Figure 3:
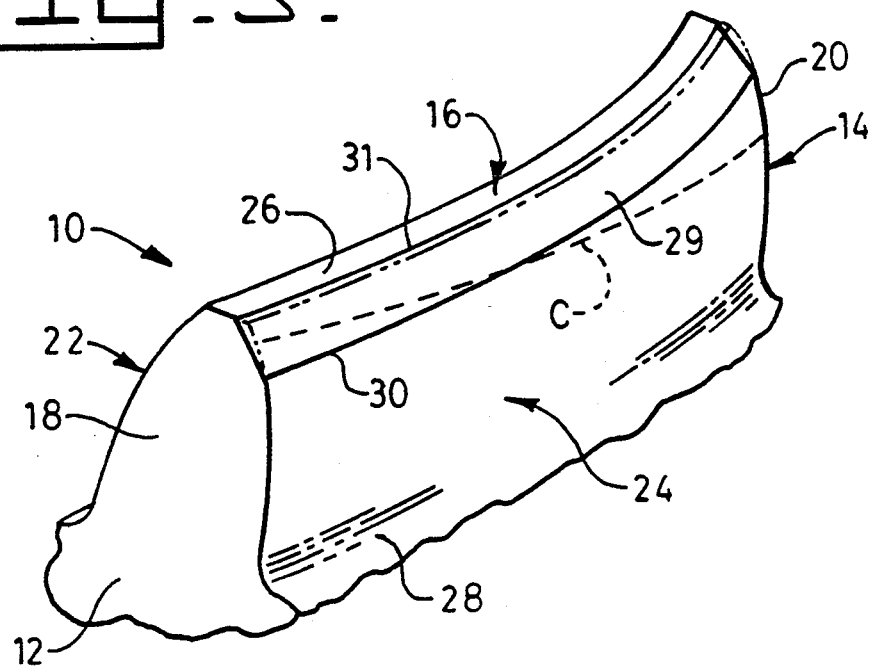
FIG. 3 is a fragmentary and enlarged pictorial view of a single tooth of the tip-relieved spiral bevel gear shown in FIG. 2.

A large, heavy duty tip-relieved spiral bevel gear 10 constructed in accordance with the present invention is illustrated in FIGS. 2 and 3. As used herein the term "spiral bevel gear" is meant to include both the spiral bevel gear and hypoid gear forms. In use, the spiral bevel gear 10 is adapted to mate with a conventional pinion gear, not shown.

Figure 4:
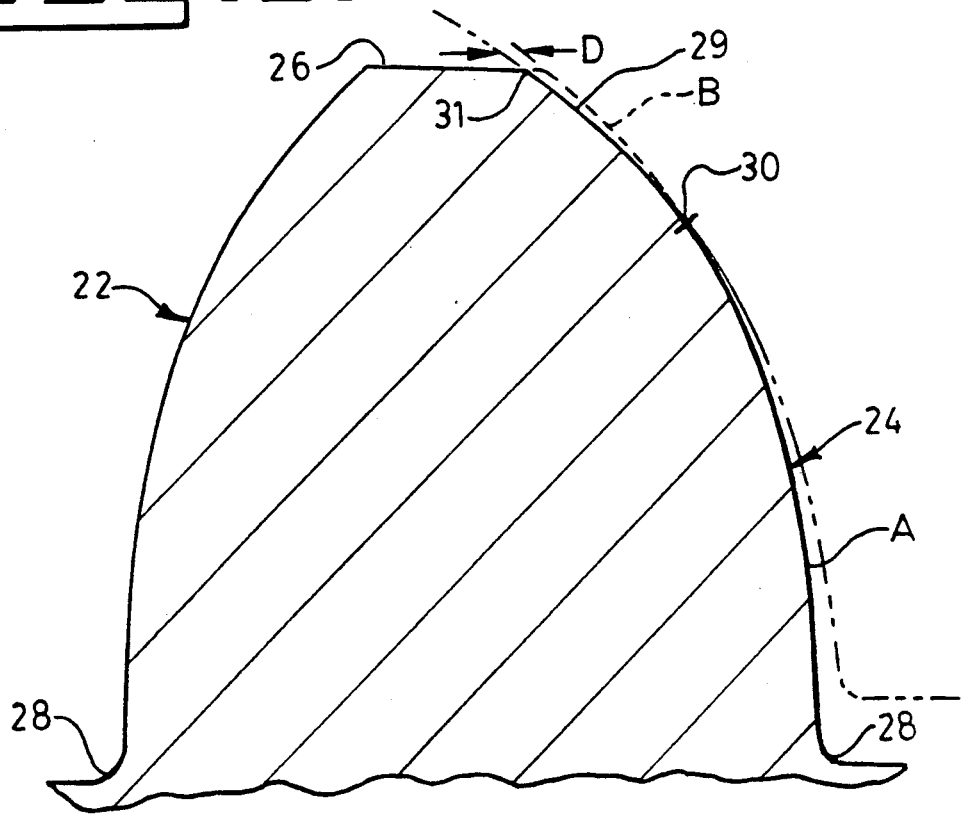
FIG. 4 is a diagrammatic and enlarged cross section of the single tooth shown in FIG. 3 illustrating on the convex side face thereof in lower solid and upper broken lines a first pass machining cut, and in upper solid and lower phantom lines a second pass machining cut.

The spiral bevel gear 10 includes a gear body 12 having a plurality of modified gear teeth 14 uniformly spaced about the oblique peripheral face thereof. Each of the gear teeth 14 has an identical curved profile 16 as is shown by FIG. 3, from a toe portion 18 to a heel portion 20 thereof. The curved profile 16 defines a concave tooth face 22 and a convex tooth face 24 from an outer tip surface 26 to an inner root surface 28. In accordance with a major feature of the invention the convex tooth face 24 is modified to have a relatively uniform, tip-relieved surface 29 from the toe portion 18 to the heel portion 20, or fully across the tooth. Each of the modified gear teeth 14 has a preselected face angle A as is illustrated in FIG. 2, for example 69 degrees and 3 minutes, and the tip-relieved surface 29 is essentially parallel to the face angle at the outer tip surface 26 from an inner boundary line 30 to an outer boundary line 31. As is illustrated in FIG. 4, that portion of the convex tooth face 24 radially inwardly of the boundary line 30 toward the root 28 and shown by a solid line is similar in geometry to a conventional tooth face. That portion of the convex tooth face radially outwardly of the boundary line 30 and shown by a solid line is distinct from the conventional profile without any tip relief as is shown by a radially outer broken line.

Figure 1:
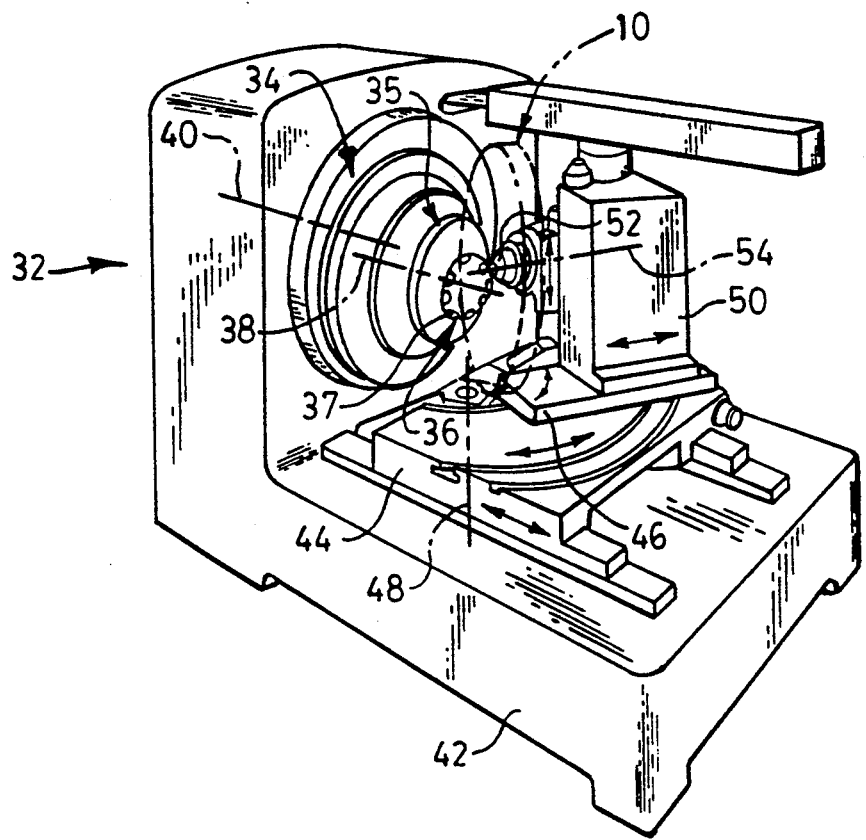
FIG. 1 is a diagrammatic perspective view of a gear generating machine of the general type used to manufacture the tip-relieved spiral bevel gear of the present invention (shown in phantom lines)

A known gear generating machine 32 is illustrated in FIG. 1 of the general class for making spiral bevel gears. For example, a Model No. 640 CNC Hypoid Generator, arranged with an Allen-Bradley 8600 Controller, and commercially produced by The Gleason Works, a Division of Gleason Corporation of Rochester, N.Y., has proven to be satisfactory for making the tip-relieved spiral bevel gear 10. Such a gear generating machine 32 has cradle 34 which supports a cutter spindle 35 in an eccentric manner thereon. A circular cutting tool or milling cutter 36 having a plurality of cutting blades 37 and a tool axis 38 is mounted on the spindle and is carried along a circular path, the center of which is known as the cradle axis 40. The gear generating machine further has a main frame 42 supporting the cradle 34 and a sliding base 44 adjustably mounted for movement in a longitudinal direction or normally parallel to the axes 38 and 40. A work head platform 46 is suitably supported on the sliding base 44 for pivotable movement about a vertical axis 48 so that the root angle setting can be changed. A work head 50 is subsequently linearly adjustably mounted on the work head platform 46 to provide an adjustable head setting. And furthermore, a workpiece spindle or holder and conventional chuck 52 having an axis of rotation 54 is adjustably mounted for vertical movement on the work head 50 to provide a work offset setting. In FIG. 1 the spiral bevel gear 10 is diagrammatically illustrated by phantom lines in order to clearly show the workpiece spindle 52, and the work head platform 46 and work head 50 have been rotated in a counterclockwise direction when looking down along the axis 48 for illustrative convenience.

Industrial Applicability

In operation, a gear blank already having teeth rough-cut thereon is installed on the workpiece spindle 52 as is generally indicated by the phantom outline in FIG. 1, and the milling cutter 36 is installed on the cutter spindle 35 of the gear generating machine 32. A series of linear and angular measurements are programmed into the gear generating machine by the operator to provide the desired semi-finished pass cut in a conventional manner. In one embodiment of the invention a bevel gear set is provided including the spiral bevel gear 10 and a mating pinion gear, not shown, having the following design parameters:

|  | bevel gear 10 | pinion gear |
| --- | --- | --- |
| number of teeth | 47 | 20 |
| diametral pitch | 1.612" | 1.612" |
| face width | 4.000" | 4.000" |
| pressure angle |  | 22D 30M |
| shaft angle |  | 90D 0M |
| outer cone distance | 15.843" | 15.843" |
| addendum | 0.440" | 0.800" |
| dedendum | 0.919" | 0.599" |
| outside diameter | 29.501" | 13.879" |
| pitch apex to crown | 5.799" | 14.265" |
| face angle of blank | 69D 3M | 26D 9M |
| root angle | 63D 44M | 20D 59M |
| hand of spiral | LH | RH |

The inputted gear generating machine settings to achieve the aforementioned design parameters are:

| basic radial setting (S) | 14.427111 inches |
| --- | --- |

-continued

| basic swivel angle setting (J) | 0.384917 radians |
| --- | --- |
| basic offset setting (EM) | 0.000000 inches |
| machine root angle | 1.112480 radians |
| basic sliding base (DELTA XB) | −0.030927 inches |
| calculated cutter pt radius (RCP) | 8.840000 inches |
| cutter blade angle | 0.410152 radians |
| basic ratio of roll | 1.085071 |

The above noted definitions are well understood in the art and will not be explained in detail here.

Thus, the preferred first step in manufacturing the tip-relieved spiral bevel gear 10 is established as (a) installing a gear piece on the workpiece spindle 52 of the gear generating machine 32, installing the required cutting tool 36 on the cutter spindle 35, inputting the semi-finished data into the processor of the gear generating machine such as noted above, and cutting a plurality of semi-finished teeth in a first pass. The cross section of one of these teeth on the convex tooth face 24 is delineated in FIG. 4 by the solid line A from the root 28 to the boundary line 30, and by the broken line B from the boundary line 30 outwardly to the tip surface 26.

The following subsequent steps are established to cut in a second pass the tip-relieved surfaces 29 in the tip-relieved spiral gear 10:

(b) inputting the basic machine settings required to produce the tip relief, such as the following, into the gear generating machine 32;

| basic radial setting (S) | 14.427111 inches |
| --- | --- |
| basic swivel angle setting (J) | 0.384917 radians |
| basic offset setting (EM) | −0.130000 inches |
| machine root angle | 1.112480 radians |
| basic sliding base (DELTA XB) | 0.100000 inches |
| calculated cutter pt radius (RCP) | 8.840000 inches |
| cutter blade angle | 0.410152 radians |
| basic ratio of roll | 1.102650 |

(c) rotating the cradle 34 to a preselected start position;

(d) rotating the workpiece spindle 52 to the home position;

(e) rotating the cradle 34 to a preselected center roll position with the workpiece spindle 52 rotating proportionately therewith at the basic ratio of roll;

(f) releasing the chuck of the workpiece spindle 52, advancing the sliding base 44 to its cutting position, rotating the workpiece in the chuck until the convex tooth face of a tooth is contacting the rotary cutting tool 36, reclamping the chuck, and withdrawing the sliding base 44;

(g) rotating the cradle 34 to the preselected start position;

(h) rotating the workpiece spindle 52 to the home position;

(i) resetting the sliding base 44 by a preselected distance added to the basic sliding base, in the example 0.030" is added to the setting of 0.100000 inches; and (j) cutting the teeth 14 on the convex tooth face 24 in a second pass of the rotary milling cutter 36 and providing a relatively uniform tip-relieved surface 29 from the toe portion 18 to the heel portion 20 essentially parallel to the face angle A at the outer tip surface 26.

Actually, it is a normal procedure when initially setting up the second pass of the gear generating machine 32 to purposefully err by cutting off too little of the tip-relieved surface 29 of a single tooth before proceeding. Accordingly, prior to aforementioned step (i) a preferred initial routine includes step (k) setting a stock divider indicator, not shown - but well known in the art, to zero on the convex tooth face 24. Subsequently, step (j) includes the initial routine of cutting the tip relief on a single tooth, determining the depth of the cut by reading the stock divider indicator, unchucking the workpiece and limitedly rotating the workpiece until the stock divider indicator reads the desired cutting depth, and rechucking the workpiece. Thereafter, all of the teeth are cut to remove the desired amount of material and to provide the uniform tip-relieved surfaces 29.

In the instant example precise measurements were taken to determine the deviation distance D, as is shown in FIG. 4, of the relieved depth from that of an unrelieved master gear across a representative tooth. The amount of deviation from the middle was less than 0.002", as can be noted from the following deviation readings:

| at heel | at middle | at toe |
|---------|-----------|--------|
| 0.007"  | 0.0055"   | 0.0065" |

A non-generated, tip-relieved gear of the prior art type as discussed herin had the following corresponding deviation data:

| at heel | at middle | at toe |
|---------|-----------|--------|
| 0.015"  | 0.0065"   | 0.0018" |

Accordingly, it can be appreciated that the tip-relieved spiral bevel gear 10 of the present invention has a much more uniform tip relief. This can further be appreciated by noting the broken line identified by the letter C in FIG. 3, which roughly represents the radially inner boundary line of the non-generated prior art tip relief. Such an askewed relationship of the prior art relief surfaces undesirably affects the operating performance of the mating gears by increasing and making less uniform the surface contact forces therebetween.

While the foregoing description described a tip-relieved surface 29 on the convex tooth face 24, it should be understood that a tip-relieved surface can be formed in the concave tooth face 22 as well. Moreover, it is contemplated that the rotary tool 36 can alternatively be a grind wheel, not shown, rather than a bladed milling cutter without departing from the spirit of the present invention.

Other aspects, objects and advantages of this invention can be obtained from a study of the drawings, the disclosure and the appended claims.

I claim:

1. A method of machining a tip-relieved spiral bevel gear on a gear generating machine having a cradle supporting a cutter spindle in an eccentric manner, a rotary tool mounted on the cutter spindle, and a sliding base suitably supporting a workpiece spindle, comprising the steps of:
    (a) machining with the rotary tool a plurality of semi-finished teeth in a gear piece mounted on the workpiece spindle of the gear generating machine, the semi-finished teeth individually having a preselected face angle (A) and a curved profile from a toe portion to a heel portion thereof, and further defining a concave tooth face and a convex tooth face from an outer tip surface to an inner root surface;
    (b) inputting the basic machine settings required to produce the tip relief into the gear generating machine;
    (c) rotating the cradle to a preselected start position;
    (d) rotating the workpiece spindle to the home position;
    (e) rotating the cradle to a preselected center roll position;
    (f) advancing the sliding base to its cutting position and rotating the workpiece in the workpiece spindle to locate the convex tooth face against the rotary tool, and withdrawing the sliding base;
    (g) rotating the cradle to the preselected start position;
    (h) rotating the workpiece spindle to the home position;
    (i) resetting the sliding base a preselected distance; and
    (j) machining the teeth in a second pass of the rotary tool and providing a relatively uniform tip-relieved surface from the toe portion to the heel portion essentially parallel to the face angle (A) at the outer tip surface.

2. The method of claim 1 wherein step (b) includes inputting the basic machine settings into a computer numerically controlled (CNC) gear generating machine.

3. The method of claim 1 wherein steps (a) and (j) include the steps of selecting the same milling cutter.

* * * * *